United States Patent
Yonezawa et al.

(10) Patent No.: US 9,444,350 B2
(45) Date of Patent: Sep. 13, 2016

(54) DC-DC CONVERTER WITH LC RESONANCE CIRCUIT AND TRANSFORMER

(71) Applicant: FUJITSU LIMITED, Kawasaki-shi, Kanagawa (JP)

(72) Inventors: Yu Yonezawa, Sagamihara (JP); Yoshiyasu Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 326 days.

(21) Appl. No.: 14/177,269

(22) Filed: Feb. 11, 2014

(65) Prior Publication Data

US 2014/0153288 A1 Jun. 5, 2014

Related U.S. Application Data

(63) Continuation of application No. PCT/JP2011/068709, filed on Aug. 18, 2011.

(51) Int. Cl.
*H02M 3/335* (2006.01)
*H02M 1/00* (2006.01)

(52) U.S. Cl.
CPC ..... *H02M 3/33507* (2013.01); *H02M 3/33569* (2013.01); *H02M 2001/0058* (2013.01); *Y02B 70/1433* (2013.01); *Y02B 70/1491* (2013.01)

(58) Field of Classification Search
CPC .............................................. H02M 2001/007
USPC ................. 323/222, 282; 363/16, 21, 47–48
See application file for complete search history.

(56) References Cited

U.S. PATENT DOCUMENTS

| | | | | |
|---|---|---|---|---|
| 4,914,558 A | * | 4/1990 | Flickinger | H05B 41/28 315/DIG. 7 |
| 5,434,479 A | * | 7/1995 | Ohnishi | H05B 41/2883 315/209 R |
| 5,671,128 A | * | 9/1997 | Nakamura | H02M 7/523 363/16 |
| 5,737,207 A | * | 4/1998 | Uratani | H02M 1/425 363/132 |
| 5,761,055 A | * | 6/1998 | Okada | H02M 7/538 323/222 |

(Continued)

FOREIGN PATENT DOCUMENTS

| | | |
|---|---|---|
| JP | 03-060367 | 3/1991 |
| JP | 09-093947 | 4/1997 |

(Continued)

OTHER PUBLICATIONS

Yoichi Kyono, "Green Electronics No. 1, Efficient Low-Noise Power Supply Circuit Design", Chapter 5, Design and Trial Production of Dual Feed Current Resonance Power Supply, Apr. 1, 2010. CQ Publishing Co., Ltd., Partial translation.

(Continued)

*Primary Examiner* — Adolf Berhane
*Assistant Examiner* — Nusrat Quddus
(74) *Attorney, Agent, or Firm* — Fujitsu Patent Center

(57) ABSTRACT

A DC-DC converter includes a capacitor configured to be charged for a predetermined period by an external voltage, an inductor configured to constitute an LC resonance circuit together with the capacitor, a closed-loop current path configured to release energy accumulated in the capacitor after the predetermined period to cause a current flowing in the LC resonance circuit to oscillate, a transformer configured to receive a current flowing in the closed-loop current path, and a rectifying circuit situated on an output side of the transformer.

12 Claims, 16 Drawing Sheets

(56) References Cited

U.S. PATENT DOCUMENTS

| | | | | |
|---|---|---|---|---|
| 5,977,725 | A * | 11/1999 | Miyazaki | H02M 7/53803 315/209 R |
| 6,788,556 | B2 * | 9/2004 | Hosotani | H02M 3/3385 363/21.02 |
| 7,778,049 | B2 * | 8/2010 | Morota | H02M 3/33507 363/21.12 |
| 2002/0067627 | A1 * | 6/2002 | Hosotani | H02M 3/33569 363/21.16 |
| 2004/0217837 | A1 * | 11/2004 | Orr | G08C 17/04 336/182 |
| 2008/0055942 | A1 * | 3/2008 | Tao | H02M 3/33592 363/21.03 |
| 2009/0001954 | A1 * | 1/2009 | Morota | H02M 3/33507 323/282 |
| 2010/0219801 | A1 * | 9/2010 | Yonezawa | H02M 3/156 323/282 |

FOREIGN PATENT DOCUMENTS

| | | |
|---|---|---|
| JP | 2001-339945 | 12/2001 |
| JP | 2004-140302 | 5/2004 |

OTHER PUBLICATIONS

International Search Report, mailed in connection with PCT/JP2011/068709 and mailed Oct. 11, 2011.

* cited by examiner

DC-DC CONVERTER WITH LC RESONANCE CIRCUIT AND TRANSFORMER

CROSS-REFERENCE TO RELATED APPLICATIONS

This application is a continuation application of International Application PCT/JP2011/068709 filed on Aug. 18, 2011 and designated the U.S., the entire contents of which are incorporated herein by reference.

FIELD

The disclosures herein relate to a DC-DC converter.

BACKGROUND

A typical forward-type DC-DC converter includes a switch circuit that alternately switches on and off an electric current flowing through the primary side of a transformer in a predetermined cycle. In response to the repeatedly alternating on-state and off-state of the primary-side current, an electric current appearing on the secondary side alternates between an on-state and an off-state. The secondary-side current that alternates between the on-state and the off-state is rectified by a rectifying circuit, and is then smoothed by a capacitor and an inductor, thereby generating an output having an approximately constant current and voltage.

In the DC-DC converter having the configuration described above, an electric current flowing through the transformer is of a rectangular wave form, which exhibits a sudden change at the edges thereof so as to include high frequency components. The higher the operating frequency, the greater the loss in the core of the transformer is.

It is thus not preferable to use an electric current having a rectangular wave shape.

A DC-DC converter disclosed in None-Patent Document 1 utilizes an LC resonance circuit to generate an electric current having a sinusoidal wave form whose frequency is equal to the resonance frequency. An electric current having a wave form synthesized from this sinusoidal-wave-form current is then supplied to the transformer. The fact that a sinusoidal wave has only one frequency component without having higher frequency components ensures that loss in the transformer is small, thereby allowing an efficient DC-DC converter to be provided.

However, the DC-DC converter disclosed in None-Patent Document 1 does not use PWM (pulse-width modulation) control to adjust the output voltage thereof, but changes the switching frequency on the primary side of the transformer to adjust the output voltage thereof. Such a configuration involves the use of a VCO (voltage-controlled oscillator) or the like, which results in a cost increase. Further, a small load connected to the output means that the switching frequency is to be increased. In such a case, the wave form input into the transformer ends up having a shape distorted from a sinusoidal wave form, which results in an increase in the loss in the transformer.

A DC-DC converter disclosed in Patent Document 1 utilizes an LC resonance circuit to generate an electric current having a sinusoidal wave form whose frequency is equal to the resonance frequency, thereby reducing switching loss occurring in transistors. In such a DC-DC converter, the sinusoidal wave form of electric current input into the transformer cannot be maintained under certain conditions of switching timing, which may cause an increase in the loss in the transformer.

[Patent Document 1] Japanese Laid-open Patent Publication No. 03-060367

[None-Patent Document 1] "Green Electronics No. 1, Designing of Highly Efficient, Low-Noise Power Supply Circuit", p. 55, CQ Publishing Co., Ltd., Apr. 1, 2010

SUMMARY

According to an aspect of the embodiment, a DC-DC converter includes a capacitor configured to be charged for a predetermined period by an external voltage, an inductor configured to constitute an LC resonance circuit together with the capacitor, a closed-loop current path configured to release energy accumulated in the capacitor after the predetermined period to cause a current flowing in the LC resonance circuit to oscillate, a transformer configured to receive a current flowing in the closed-loop current path, and a rectifying circuit situated on an output side of the transformer.

According to another aspect, a DC-DC conversion method includes charging a capacitor with an external voltage for a predetermined period, releasing energy accumulated in the capacitor after the predetermined period to cause a current to flow and oscillate in a closed-loop current path inclusive of an LC resonance circuit that includes the capacitor and an inductor, supplying the current flowing in the closed-loop current path to a transformer, and rectifying an output of the transformer.

An information apparatus includes a DC-DC converter, a CPU; and a memory device, wherein the DC-DC converter includes a capacitor configured to be charged for a predetermined period by an external voltage, an inductor configured to constitute an LC resonance circuit together with the capacitor, a closed-loop current path configured to release energy accumulated in the capacitor after the predetermined period to cause a current flowing in the LC resonance circuit to oscillate, a transformer configured to receive a current flowing in the closed-loop current path, and a rectifying circuit situated on an output side of the transformer.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments of the invention will be described with reference to the accompanying drawings.

Figure 1:
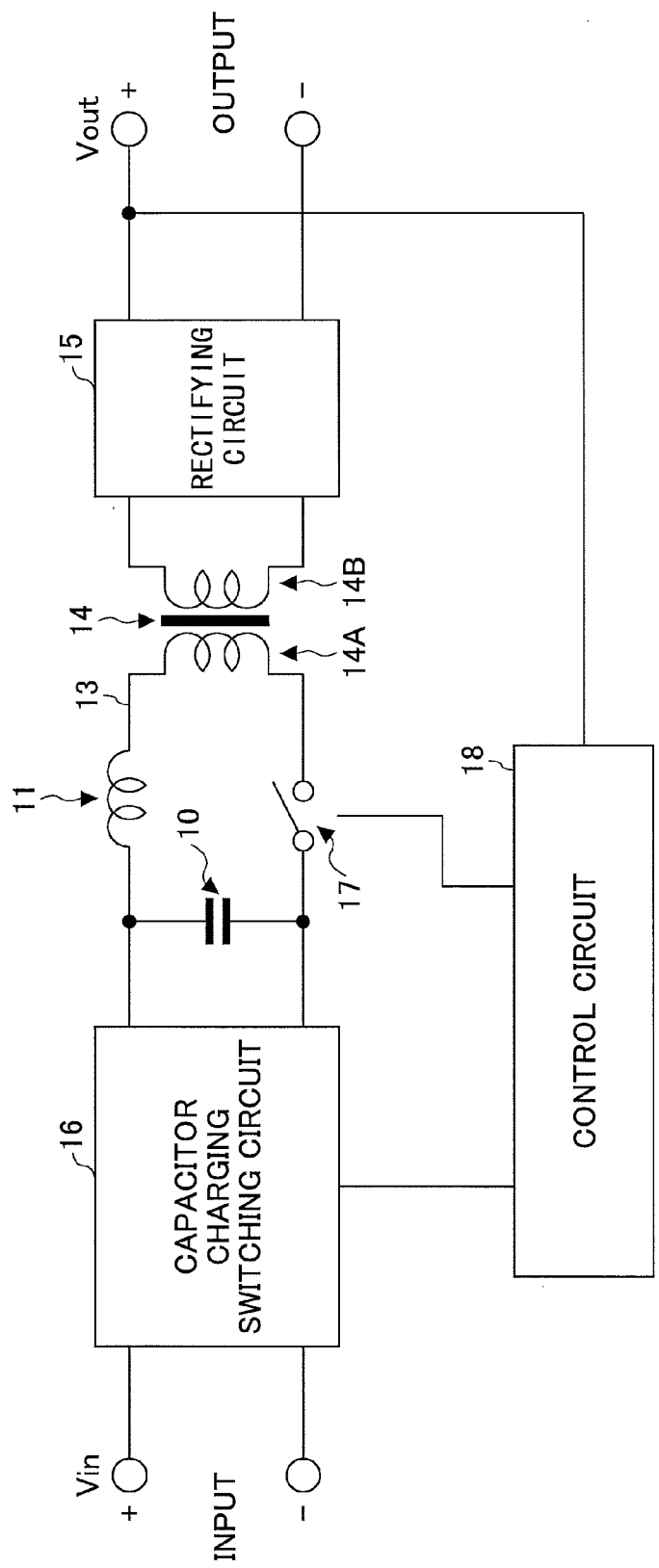
FIG. 1 is a drawing illustrating an example of the configuration of a DC-DC converter according to an embodiment.

FIG. 1 is a drawing illustrating an example of the configuration of a DC-DC converter according to an embodiment. A DC-DC converter illustrated in FIG. 1 includes a capacitor 10, an inductor 11, a transformer 14, a rectifying circuit 15, a capacitor charging switching circuit 16, a switch circuit 17, and a control circuit 18. The capacitor charging switching circuit 16 receives a direct-current voltage Vin that is input into the DC-DC converter. The rectifying circuit 15 produces a direct-current voltage Vout that is output from the DC-DC converter.

The capacitor charging switching circuit receives from the control circuit 18 a pulse signal having the pulse width thereof adjusted by PWM control, and outputs the direct-current voltage Vin for the duration of this pulse width. With this arrangement, the capacitor 10 is charged by the external voltage Vin for the duration of the PWM-controlled pulse width. The inductor 11 and the capacitor 10 together constitute an LC resonance circuit. A closed-loop current path 13 includes the capacitor 10, the inductor 11, a primary-side coil 14A of the transformer 14, and the switch circuit 17. During the time the capacitor 10 is charged by the capacitor charging switching circuit 16, the switch circuit 17 is held in a disconnected state (i.e., open state).

After the charging by the capacitor charging switching circuit 16, i.e., after the end of the previously-noted pulse period, the switch circuit 17 is placed in a conductive state, resulting in the energy accumulated in the capacitor 10 being released to the closed-loop current path 13. With the releasing of the energy accumulated in the capacitor 10, the electric current flowing in the LC resonance circuit in the closed-loop current path 13 oscillates at the resonance frequency that is determined by capacitance C of the capacitor 10 and inductance L of the inductor 11. To be specific, the resonance frequency is $1/(LC)^{1/2}$.

The transformer 14 receives the current flowing in the closed-loop current path 13. The rectifying circuit 15 is situated on the output side of the transformer 14. The rectifying circuit 15 rectifies the electric current flowing through a secondary-side coil 14B of the transformer 14. Further, a capacitor and an inductor embedded in the rectifying circuit 15 smooth the electric current to produce an output having a substantially constant voltage and current. The control circuit 18 performs feedback control based on a voltage responsive to the output of the rectifying circuit 15, thereby performing PWM control with respect to the pulse width of the pulse signal that is supplied to the capacitor charging switching circuit 16. The control circuit 18 also controls the open and closed states of the switch circuit 17 in response to the PWM control of the pulse width.

With the arrangement described above, the releasing of the energy accumulated in the capacitor in the DC-DC converter illustrated in FIG. 1 causes the electric current flowing through the LC resonance circuit to oscillate in the closed-loop current path 13. This oscillating current is transmitted to the rectifying circuit 15 through the transformer 14. This current has a sinusoidal-wave current form having the frequency thereof equal to the resonance frequency of the LC resonance circuit. The fact that a sinusoidal wave has only one frequency component without having higher frequency components ensures that loss in the transformer 14 is small, thereby allowing an efficient DC-DC converter to be provided.

Figure 2:
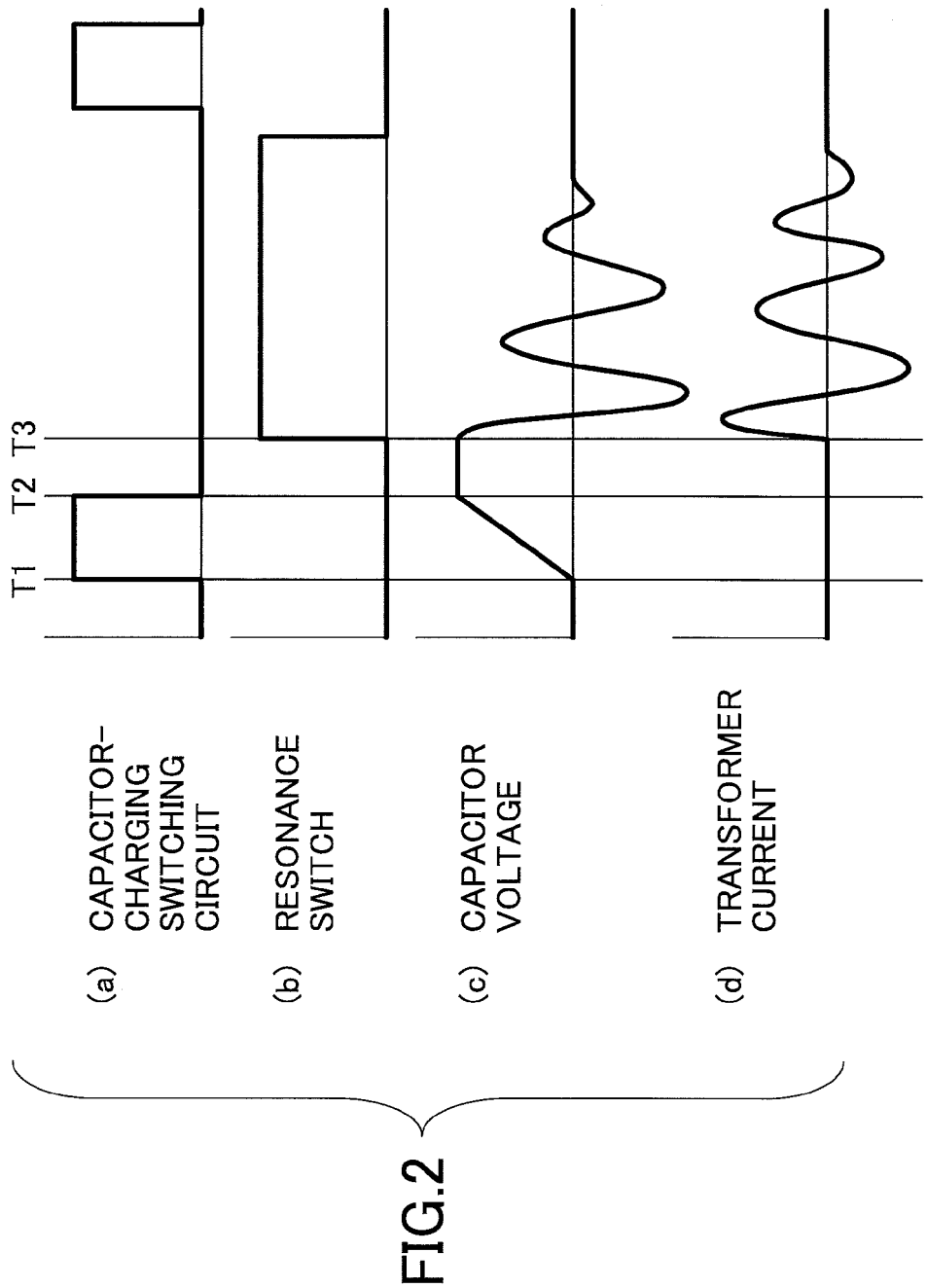
FIG. 2 is a drawing illustrating the operation of the DC-DC converter illustrated in FIG. 1.

FIG. 2 is a drawing illustrating the operation of the DC-DC converter illustrated in FIG. 1. FIG. 2-(a) represents the wave form of the output voltage of the capacitor charging switching circuit 16. The output voltage is HIGH during the period from T1 to T2 to charge the capacitor 10. FIG. 2-(b) illustrates the wave form of a switch control signal for controlling the open and closed states of the switch circuit 17 serving as a resonance switch. During the HIGH period of this switch control signal, the switch circuit 17 is placed in a conductive (i.e., closed) state, so that the energy accumulated in the capacitor 10 is released to the closed-loop current path 13. FIG. 2-(c) illustrates the capacitor voltage, i.e., the voltage across the capacitor 10. The capacitor voltage increases as a result of charging during the period from T1 to T2. Upon the switch circuit 17 becoming conductive at T3, the capacitor voltage drops due to the discharging of the capacitor 10. As a result of resonance of the LC resonance circuit, the current flowing through the closed-loop current path 13 oscillates at the resonance frequency. FIG. 2-(d) illustrates a transformer current, i.e., the oscillating current that flows through the closed-loop current path 13.

Further, the resonance of the LC resonance circuit causes the capacitor 10 to be repeatedly charged and discharged, so that the capacitor voltage illustrated in FIG. 2-(c) oscillates, and gradually loses its electric charge while oscillating. The energy that is lost from the capacitor 10 is transmitted to the secondary side of the transformer to be turned into the direct-current voltage output of the DC-DC converter.

Figure 3:
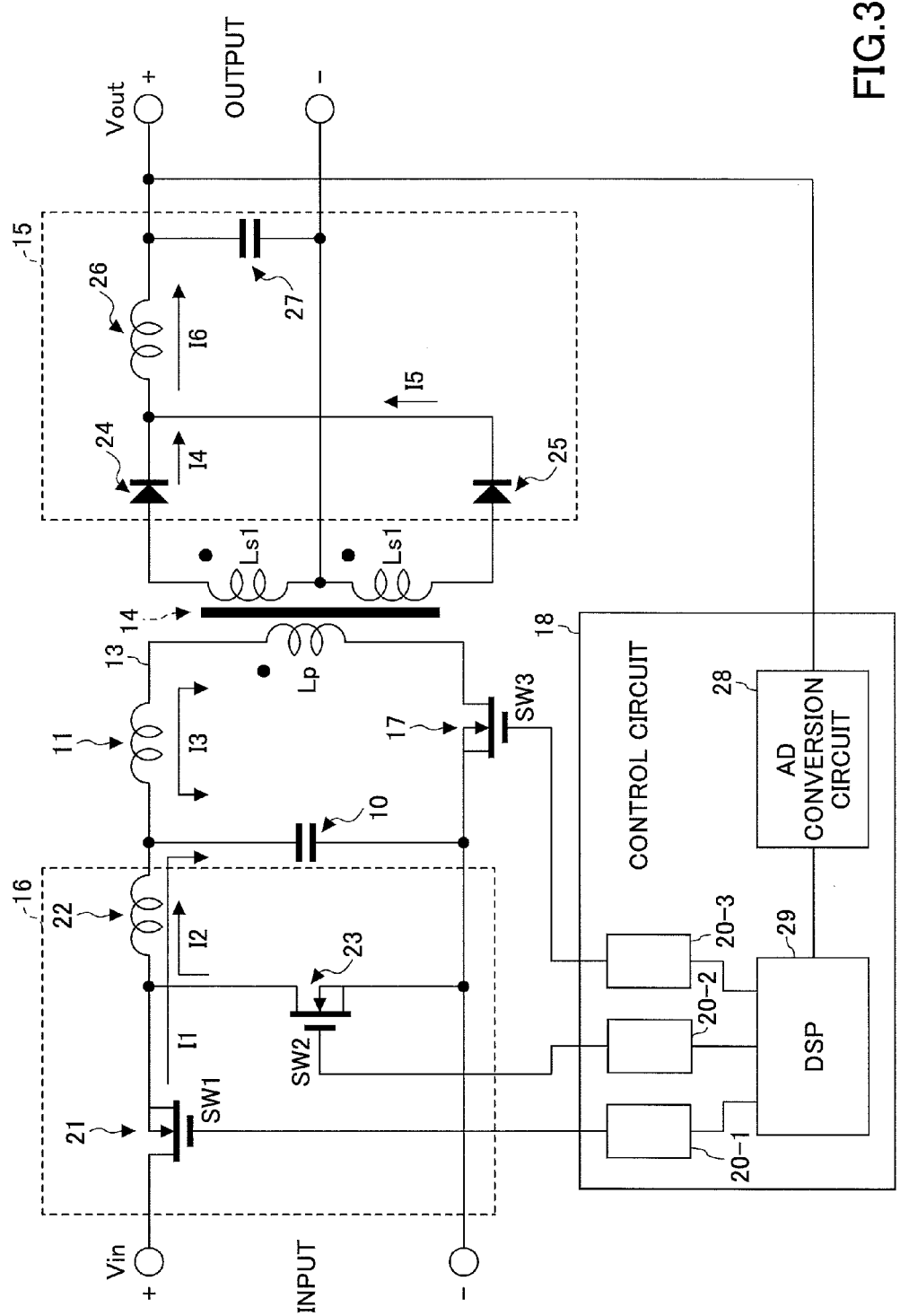
FIG. 3 is a drawing illustrating a more specific example of the configuration of the DC-DC converter illustrated in FIG. 1.

FIG. 3 is a drawing illustrating a more specific example of the configuration of the DC-DC converter illustrated in FIG. 1. The capacitor charging switching circuit 16 includes a switch circuit 21, an inductor 22, and a switch circuit 23. The switch circuit 17, the switch circuit 21, and the switch circuit 23 may be transistors, and may be NMOS transistors, for example. The rectifying circuit 15 includes diodes 24 and 25, an inductor 26, and a capacitor 27. The control circuit 18 includes gate drivers 20-1 through 20-3, an AD conversion circuit 28, and a DSP (digital signal processor) 29.

The control circuit 18 uses the AD conversion circuit 28 to convert the output voltage of the rectifying circuit 15 into a digital signal, and supplies the obtained digital signal to the DSP 29. The DSP 29 drives the gate drivers 20-1 through 20-3 in response to the digital signal indicative of the output voltage of the rectifying circuit 15. With this arrangement, the gate drivers 20-1 through 20-3 supply, to the switch circuits 21, 23 and 17, gate signals having pulse widths responsive to the output voltage of the rectifying circuit 15.

Figure 4:
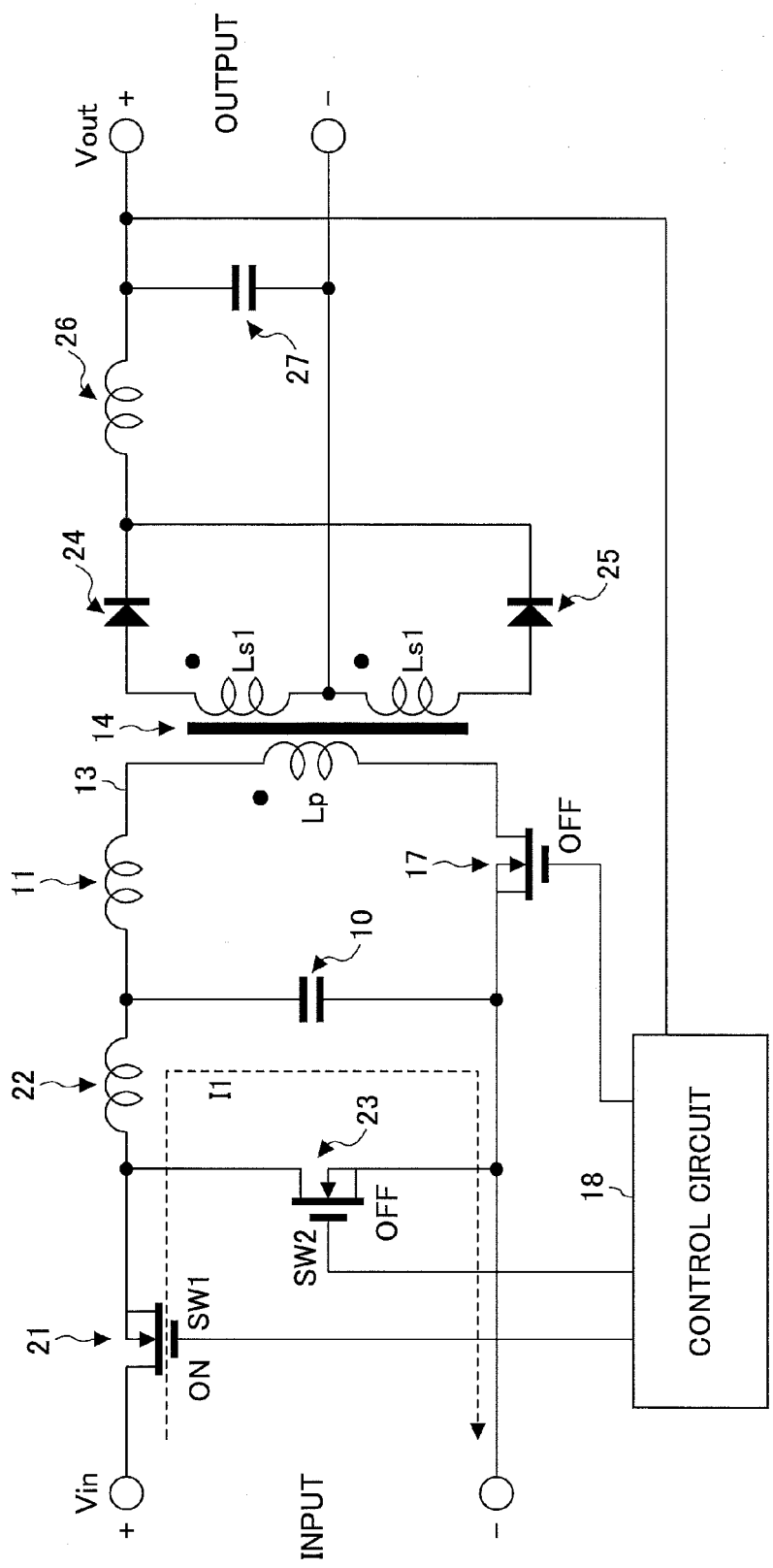
FIG. 4 is a drawing illustrating switch conditions and current flows in a given operating state of the DC-DC converter illustrated in FIG. 3.
Figure 5:
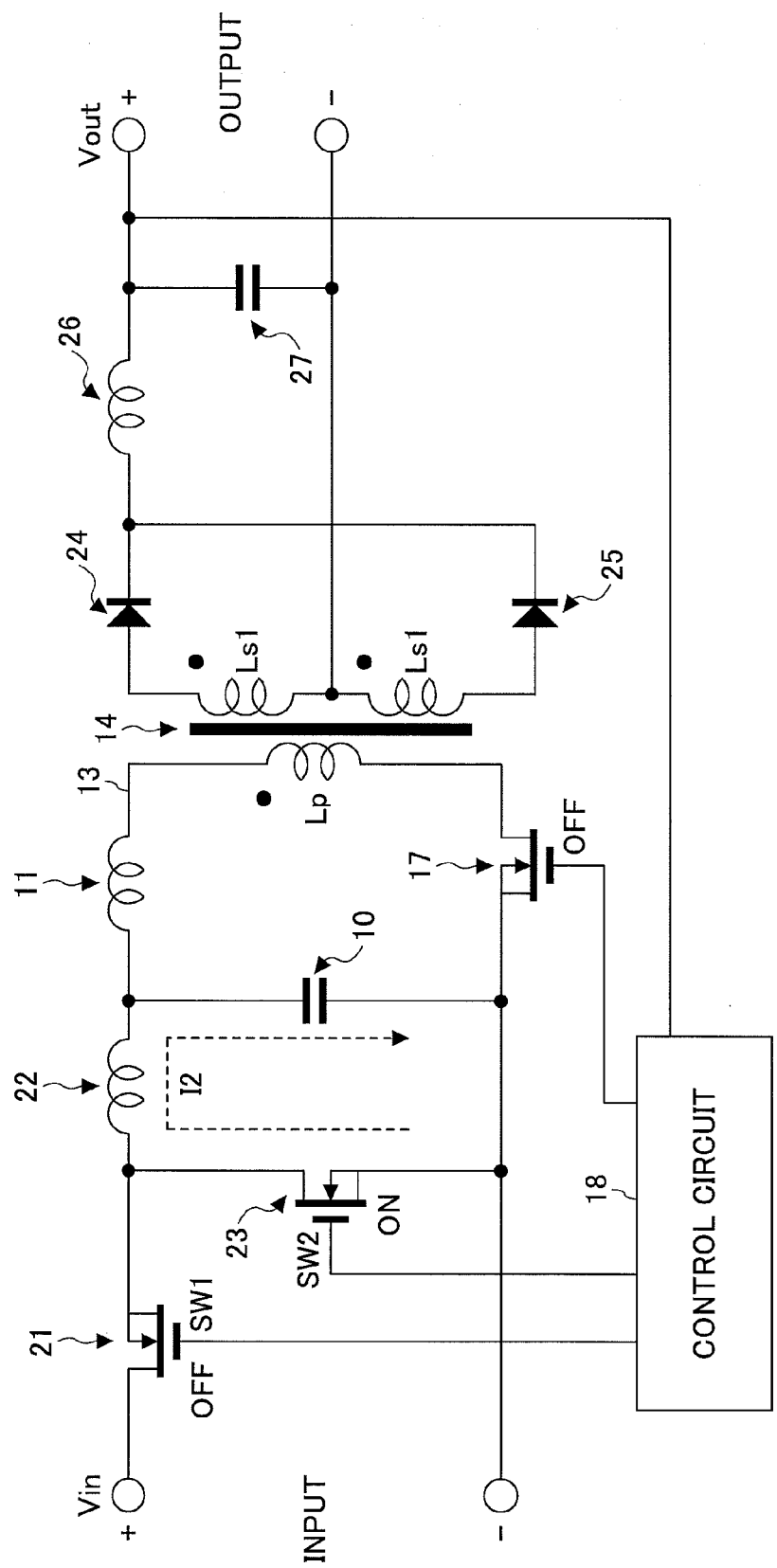
FIG. 5 is a drawing illustrating switch conditions and current flows in a given operating state of the DC-DC converter illustrated in FIG. 3.
Figure 6:
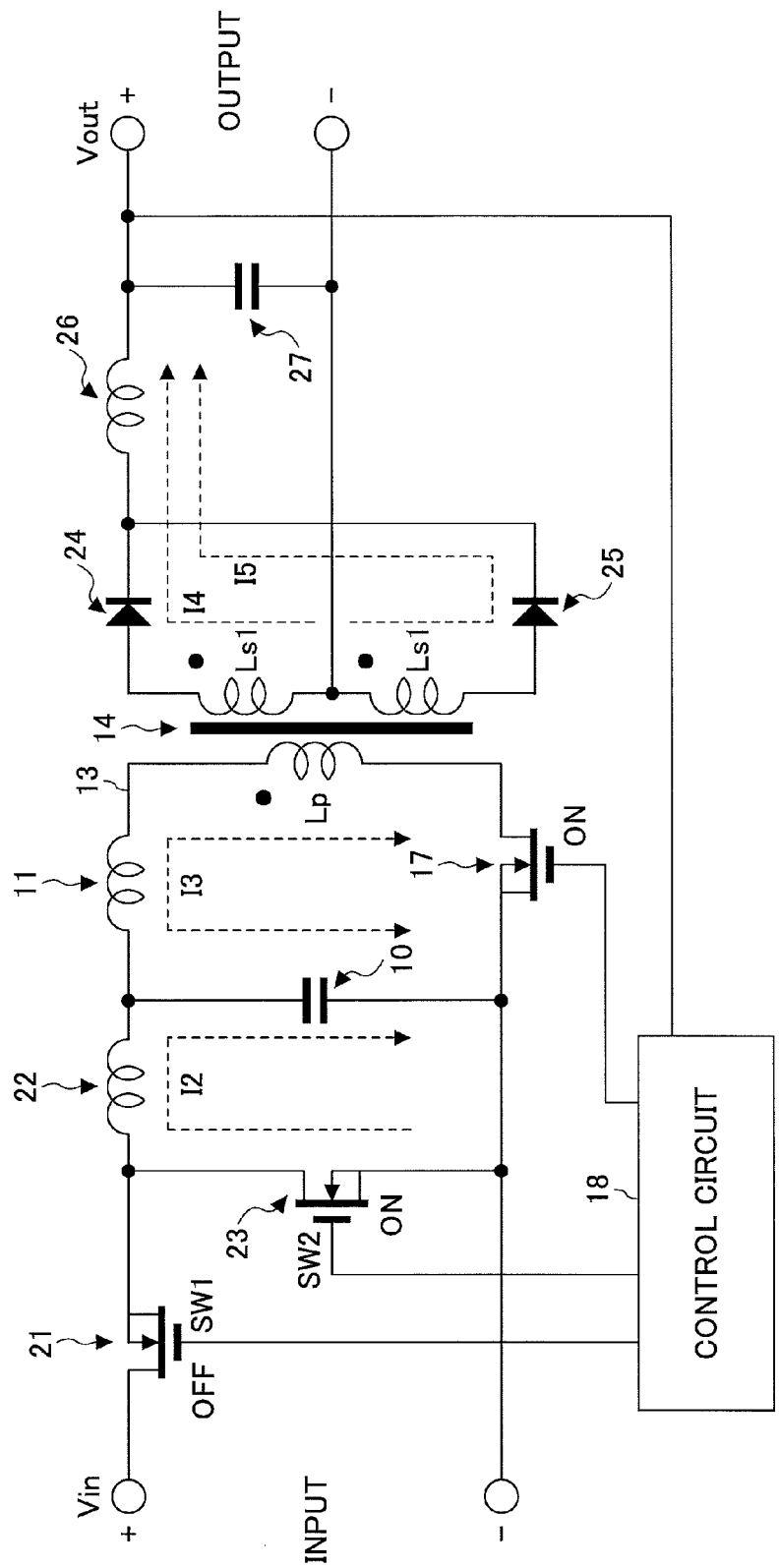
FIG. 6 is a drawing illustrating switch conditions and current flows in a given operating state of the DC-DC converter illustrated in FIG. 3.

FIG. 4 through FIG. 6 are drawings illustrating switch conditions and current flows in respective operating states of the DC-DC converter illustrated in FIG. 3. FIG. 4 illustrates an operating state in which the switch circuit 21 is ON (i.e., conductive), and the switch circuits 17 and 23 are both OFF (i.e., nonconductive). In this state, a current I1 responsive to an input voltage Vin flows through the switch circuit 21, the inductor 22, and the capacitor 10, so that the capacitor 10 is charged by the external voltage Vin. The switch circuit 21 is situated in a path outside the closed-loop current path 13. The switch circuit 21 is conductive during the period equal to a pulse width specified by the control circuit 18 to supply a charge current to the capacitor 10. The inductor 22 is situated in a path outside the closed-loop current path 13 and series-connected with the switch circuit 21. The above-noted charge current flows through the inductor 22. If the inductor 22 was not provided, a large amount of current would flow through the capacitor 10 and through the ON-resistance of the switch circuit 21, resulting in a large power loss in the switch circuit 21. The provision of the inductor 22 serves to reduce the amount of the current I1, thereby suppressing power loss in the switch circuit 21.

FIG. 5 illustrates an operating state that occurs following the operating state illustrated in FIG. 4 through a change to an OFF state (i.e., nonconductive state) of the switch circuit 21 and a change to an ON state (i.e., a conductive state) of the switch circuit 23. The switch circuit 17 stays OFF (i.e., nonconductive). In this state, a current responsive to the accumulated energy (i.e., magnetic flux) of the inductor 22 flows in the closed-loop current path including the inductor 22, the capacitor 10, and the switch circuit 23, thereby continuing to charge the capacitor 10 even after the end of charging by the external voltage Vin. This is because the change to the OFF state of the switch circuit 21 and the change to the ON state of the switch circuit 23 at the time the current is flowing through the inductor 22 results in the inductor 22 acting as a force to continue supplying the current. When this happens, it is preferable to avoid the situation in which both of the switch circuits 21 and 23 simultaneously become ON even for a brief moment because such a situation results in a through current flowing through the switch circuits 21 and 23. Accordingly, the switch circuit 23 may be turned on upon passage of a certain time period following the change to OFF of the switch circuit 21 in order to provide a margin for error. Namely, the change to ON of the switch circuit 23 may occur with some delay after the change to OFF of the switch circuit 21. Such a delay may be set equal to a certain time length by taking into account the switching time length of the switch circuits 21 and 23 (i.e., the time length required for switching) such that no through current flows. The same applies in the case in which the switch circuit 23 is changed to OFF, and the switch circuit 21 is changed to ON. The inductor 22 acts as a force to continue supplying the current during the time period in which both of the switch circuits 21 and 23 are OFF, so that the current flows through a parasitic diode that is present in parallel to the NMOS-transistor switch circuit 23.

FIG. 6 illustrates an operating state that occurs following the operating state illustrated in FIG. 5 through a change to an ON state (i.e., a conductive state) of the switch circuit 17. The switch circuit 21 stays OFF (i.e., nonconductive), and the switch circuit 23 stays ON (i.e., conductive) Similarly to the state illustrated in FIG. 5, the current I2 responsive to the accumulated energy (i.e., magnetic flux) of the inductor 22 flows in the closed-loop current path including the inductor 22, the capacitor 10, and the switch circuit 23, thereby further charging the capacitor 10. Charging of the capacitor 10 comes to an end when the amount of the current I2 generated by the induced electromotive force of the inductor 22 becomes zero with the accumulated energy of the inductor 22 being depleted. In conjunction with this operation, the accumulated charge of the capacitor is discharged through the closed-loop current path 13 including the inductor 11, the primary-side coil of the transformer 14, and the switch circuit 17, resulting in a current I3 flowing in the closed-loop current path 13. The inductance of the inductor 22 is larger than the inductance of the inductor 11, so that the discharge current of the capacitor 10 barely flows toward the inductor 22, and mostly flows toward the inductor 11. Even when the accumulated charge of the capacitor 10 is completely discharged to become zero, the current I3 continues to flow due to the accumulated energy (i.e., magnetic flux) of the inductor 11, thereby charging the capacitor 10 in the polarity opposite the initial polarity. Thereafter, the current I3 disappears when the accumulated energy of the inductor 11 becomes zero. The capacitor 10 then starts discharging, so that the current I3 starts flowing in the direction opposite to the previous direction. In this manner, the current I3 alternately flows in the opposite directions, thereby oscillating at the resonance frequency responsive to the capacitance C of the capacitor 10 and the inductance L of the inductor 11. These changes (i.e., oscillation) of the current I3 is transmitted from the primary side to the secondary side of the transformer 14. On the secondary side, a current I4 flows through the diode 24, and a current I5 flows through the diode 25.

Figure 7:
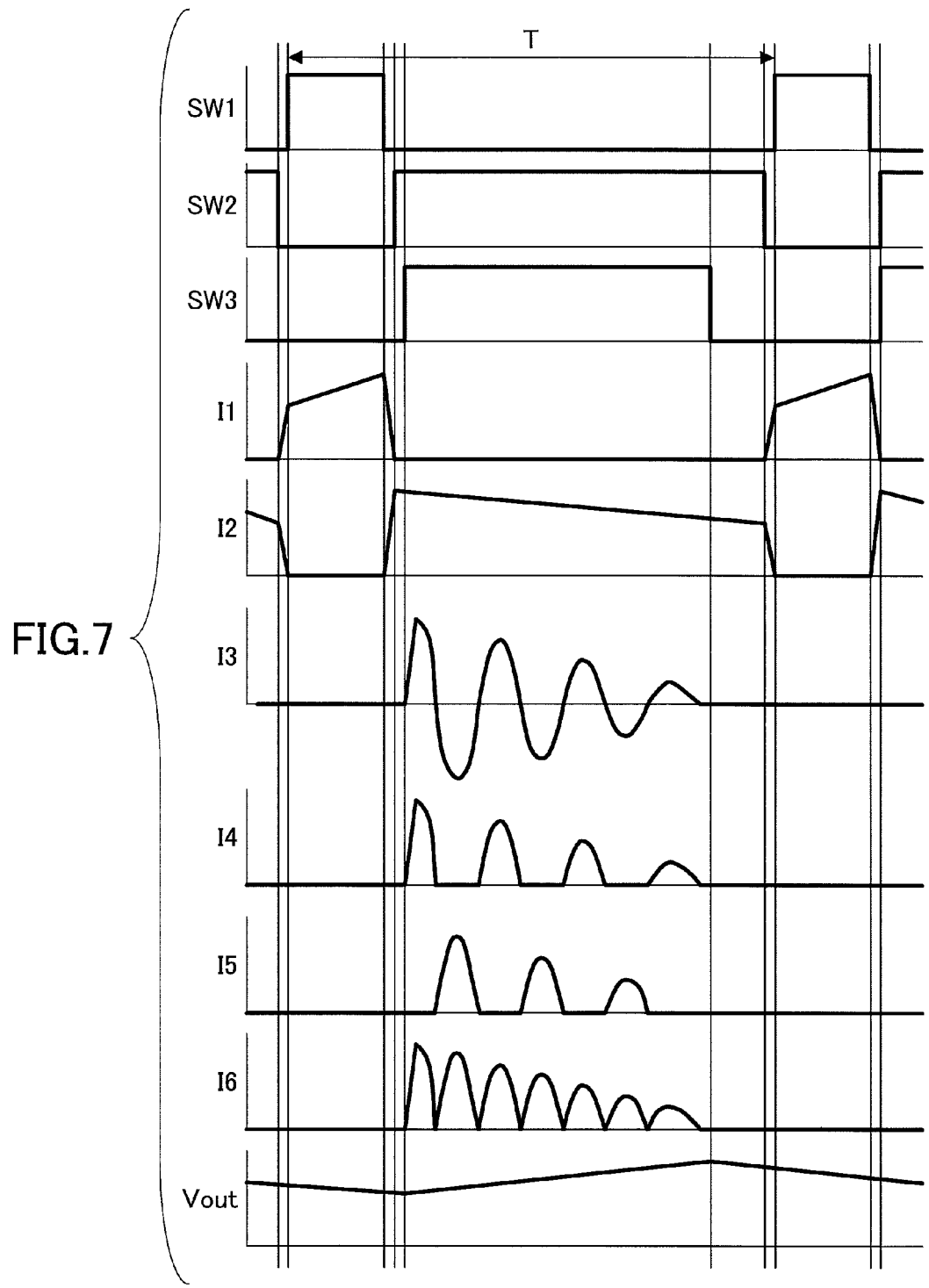
FIG. 7 is a drawing illustrating control signals and currents relating to the operations of the DC-DC converter illustrated in FIG. 4 through FIG. 6.

FIG. 7 is a drawing illustrating control signals and currents relating to the operations of the DC-DC converter illustrated in FIG. 4 through FIG. 6. The gate voltage of the switch circuit 21 is denoted as SW1. The gate voltage of the switch circuit 23 is denoted as SW2. The gate voltage of the switch circuit 17 is denoted as SW3. These gate voltages SW1 through SW3 are supplied from the gate drivers 20-1 through 20-3 of the control circuit 18, respectively. The gate voltage SW1 has a predetermined cycle T, and becomes HIGH during the period equal to a pulse width that is PWM-controlled. With this arrangement, the switch circuit 21 becomes conductive during the period responsive to the PWM control at the predetermined interval T. The current I1 flows (see FIG. 3 and FIG. 4) during the HIGH period of SW1, so that the external voltage charges the capacitor 10.

In FIG. 7, SW2 changes from LOW to HIGH after SW1 changes from HIGH to LOW. As a result, the switch circuits 21 and 23 become nonconductive and conductive, respectively, thereby suspending the supply of the current I1 and causing the current I2 to flow (see FIG. 3 and FIG. 5). Subsequently, SW3 changes from LOW to HIGH, so that the switch circuit becomes conductive, causing the current I3 to flow (see FIG. 3 and FIG. 6). The current I3 resonates due to the LC resonance circuit in the closed-loop current path 13 as previously described, thereby oscillating at the resonance frequency as illustrated in FIG. 7. In the example of operations illustrated in FIG. 7, SW3 changes to HIGH after SW2 changes to HIGH. SW2 and SW3 may change LOW to HIGH at the same time. Namely, the switch circuit 23 and the switch circuit 17 may be simultaneously changed from the nonconductive state to the conductive state. After the current I2 generated by the induced electromotive force of the inductor 22 disappears with the accumulated energy of the inductor 22 being depleted, SW2 may be changed to LOW at any time to place the switch circuit 23 in the nonconductive state. As in the example of operations illustrated in FIG. 7, however, SW2 is preferably changed to LOW so as to make the switch circuit 23 nonconductive prior to the subsequent change of SW1 to HIGH in order to avoid a through current even when the current I2 generated by the induced electromotive force of the inductor 22 has not become zero. Further, SW3 is preferably changed to LOW prior to the change of SW1 to HIGH so as to place the switch circuit 17 in the nonconductive state. SW2 and SW3 may change from HIGH to LOW simultaneously, or may change HIGH to LOW at different times as illustrated in the operation examples illustrated in FIG. 7.

In this manner, the switch circuit 17 controlled by SW3 alternates in cycles T between the conductive state and the nonconductive state, and is made nonconductive at least during the time in which the switch circuit 21 is conductive (i.e., when SW1 is HIGH). Further, the switch circuit 23 controlled by SW2 alternates in cycles T between the conductive state and the nonconductive state, and is made nonconductive at least during the time in which the switch circuit 21 is conductive (i.e., when SW1 is HIGH).

As illustrated in FIG. 7, the current I4 and the current I5 appear on the secondary side of the transformer 14 in response to the oscillation of the current I3 at the resonance frequency (see FIG. 3 and FIG. 6). The current I4 and the current I5 correspond to the positive half-wave and the negative half-wave of the current I3, respectively. The current I4 and the current I5 are combined into the full-wave rectified current I6 flowing through the inductor 26 The output voltage Vout of the DC-DC converter is smoothed by the capacitor 27 into an approximately constant level as illustrated in the example of FIG. 7.

Figure 8:
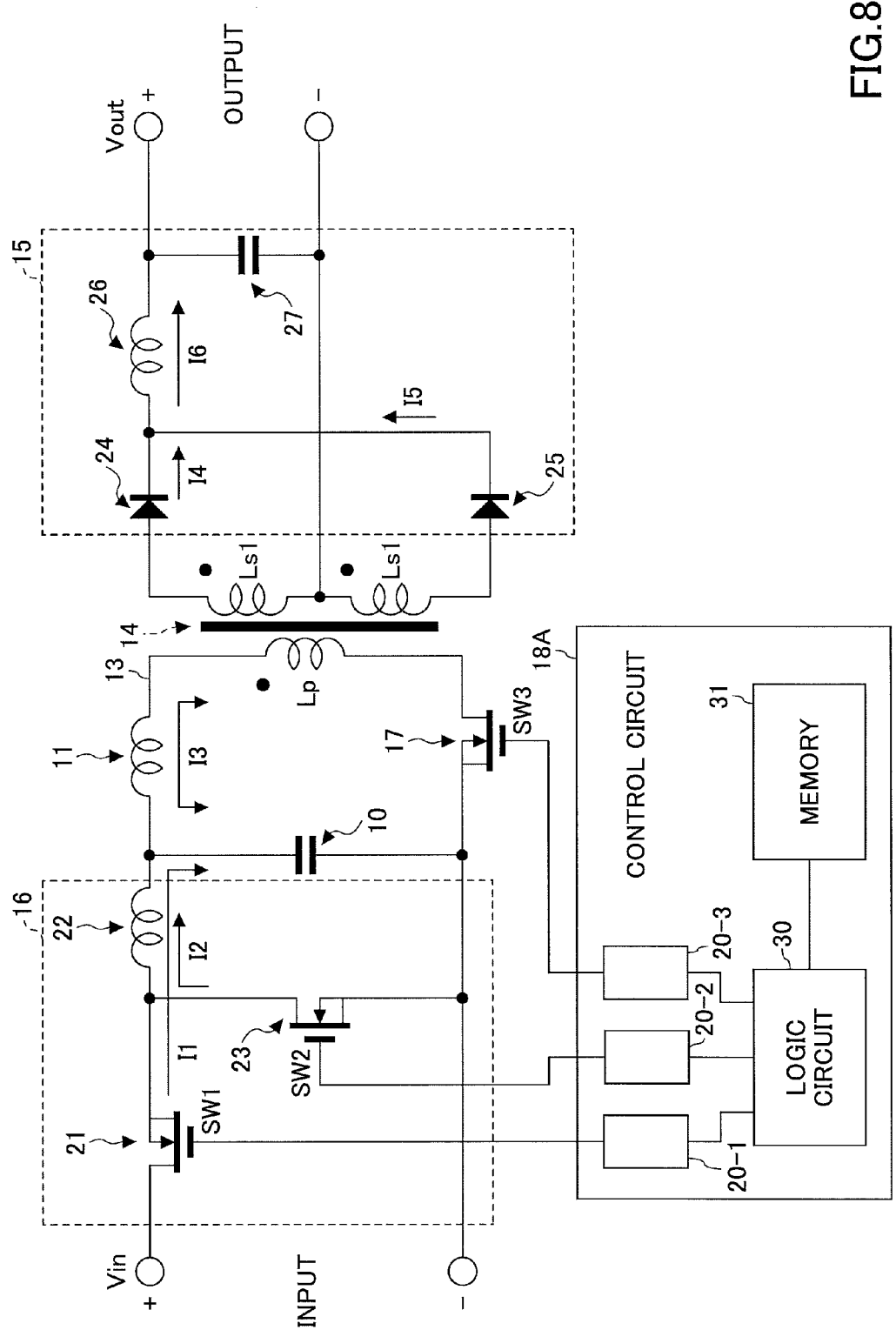
FIG. 8 is a drawing illustrating a variation of the DC-DC converter illustrated in FIG. 3.

FIG. 8 is a drawing illustrating a variation of the DC-DC converter illustrated in FIG. 3. In FIG. 8, the same elements as those of FIG. 3 are referred to by the same or similar numerals, and a description thereof will be omitted as appropriate. In the DC-DC converter illustrated in FIG. 8, a control circuit 18A is provided in place of the control circuit 18. The control circuit 18A includes gate drivers 20-1 through 20-3, a logic circuit 30, and a memory 31. In the DC-DC converter illustrated in FIG. 3, the control circuit 18 performs feedback control with respect to pulse widths in response to the output voltage of the rectifying circuit 15. In the DC-DC converter illustrated in FIG. 8, on the other hand, the control circuit 18A controls pulse widths based on a certain calculating formula. The control performed in this case is not feedback control (i.e., dynamic control responsive to the output of the rectifying circuit 15) but static control.

The pulse width of the gate voltage SW1 of the switch circuit 21 is defined as a product between a duty ratio D and the previously noted interval T (i.e., the switching interval of the switch circuit 21). The duty ratio D is obtained as follows.

$$D = (Vout/Vin)(Np/Ns)$$

Vout is a target output voltage of the DC-DC converter. Vin is the input voltage of the DC-DC converter. Np is the number of windings of the primary-side coil of the transformer 14, and Ns is the number of windings of the secondary-side coil of the transformer 14. It may be noted that (Vin/Vout) is greater than (Np/Ns).

Figure 9:
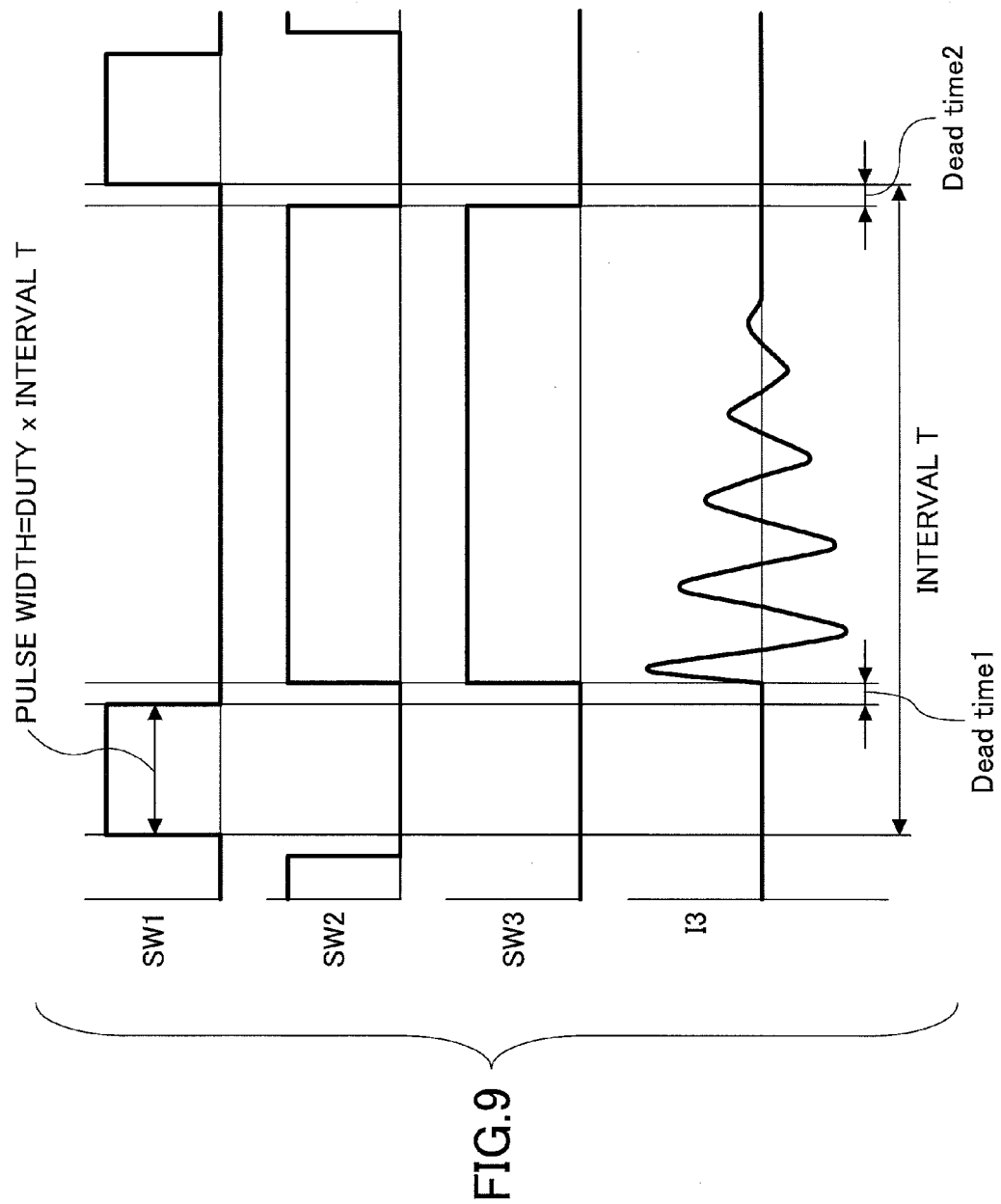
FIG. 9 is a drawing illustrating examples of wave forms when the pulse width of SW1 is calculated based on a duty ratio and an interval T, and SW2 and SW3 are set equal to the inverse of SW1.

Data indicative of Vout, Vin, Np, Ns, and T may be stored in the memory 31, for example. Based on this data, the logic circuit 30 may calculate the pulse width of SW1. The logic circuit drive the gate drivers 20-1 through 20-3 in accordance with the pulse width calculated in this manner. In so doing, SW2 and SW3 may be set equal to the inverse of SW1. Further, a switching time difference may be provided by taking into account the switching time length in order to avoid a through current. FIG. 9 is a drawing illustrating examples of wave forms when the pulse width of SW1 is calculated based on the duty ratio and the interval T, and SW2 and SW3 are set equal to the inverse of SW1. Alternatively, the memory 31 may store a table that lists pulse width values calculated in advance with respect to a plurality of different intervals T, respectively. The logic circuit 30 may read a pulse width corresponding to a desired interval T to control SW1, SW2 and SW3 based on such a pulse width.

Figure 10:
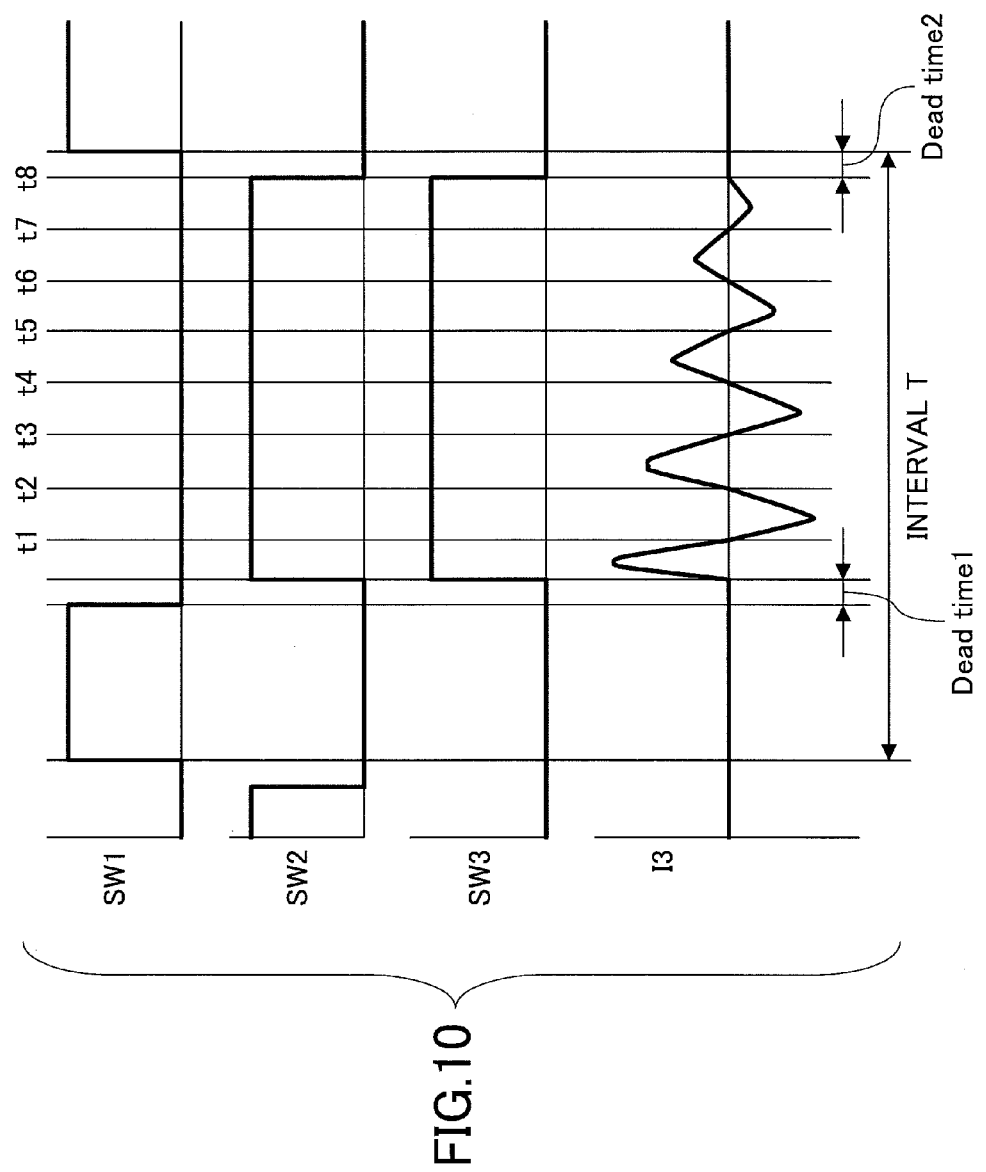
FIG. 10 is a drawing for explaining the time at which a switch circuit is turned off.

FIG. 10 is a drawing for explaining the time at which the switch circuit 17 is turned off. In the descriptions that have been provided heretofore, no limitation is given to the time at which the switch circuit 17 is made nonconductive. In the example illustrated in FIG. 3, the switch circuit 17 is an NMOS transistor, which requires some switching time length to make a transition from the ON (conductive) state to the OFF (nonconductive) state. When the switch circuit 17 is changed from ON to OFF while the current is flowing, the channel resistance gradually increases over the switching time length, thereby causing the current flowing through the channel to decrease. When this happens, the product between the voltage across the switch circuit 17 and the current flowing through the switch circuit 17 is so large as not to be ignorable, thereby generating power loss. In consideration of this, the time at which the switch circuit 17 is changed from ON to OFF preferably coincides with the time at which the current I3 flowing through the switch circuit 17 becomes zero. Namely, it is preferable for the switch circuit 17 to be changed from the conductive state to the nonconductive state at the moment at which the current flowing in the closed-loop current path 13 inclusive of the switch circuit 17 becomes zero.

In FIG. 10, points t1 through t8 in time are the points at which the current I3 oscillating at the resonance frequency is zero. Changing SW3 to LOW at any one of the points t1 through t8 in time serves to turn off the switch circuit 17 at the time at which the current I3 is zero. Namely, it is theoretically possible to completely eliminate the power loss caused by the switching of the switch circuit 17.

It may be further preferable to take into account the fact that electric charge is accumulated in the capacitor 10 when the switch circuit 17 is turned off. When the switch circuit 17 is turned off at any one of the points t1, t3, t5, and t7 illustrated in FIG. 10, the polarity of charge accumulated in the capacitor 10 is opposite to the polarity of charge accumulated by the current I1 during the ON period of the switch circuit 21. In such a case, the energy accumulated in the capacitor 10 is wasted despite the advantage that the power loss caused by switching is zero. On the other hand, when the switch circuit 17 is turned off at any one of the points t2, t4, t6, and t8 illustrated in FIG. 10, the polarity of charge accumulated in the capacitor 10 is the same as the polarity of charge accumulated by the current I1 during the ON period of the switch circuit 21. In this case, the energy accumulated in the capacitor 10 is reused in the following charge and discharge operations in addition to the advantage that the power loss caused by switching is zero. That is, an operation with no energy loss is attained.

The point in time at which the switch circuit 21 is changed to OFF as described above may be calculated in advance by the DSP 29 illustrated in FIG. 3 or the logic circuit 30 illustrated in FIG. 8. The gate driver 20-3 may change SW3 from HIGH to LOW at such a calculated time. Specifically, the time at which the switch circuit 17 is changed to OFF such as to allow the energy accumulated in the capacitor 10 to be reused in the following charge and discharge operations can be obtained as the time that is $N \cdot (LC)^{1/2}$ after the change of SW3 to HIGH. N is a positive integer, and $N \cdot (LC)^{1/2}$ is an integer multiple of the resonance frequency. Namely, the control circuit 18 or 18A may set the HIGH period of SW3 equal to $N \cdot (LC)^{1/2}$.

Figure 11:
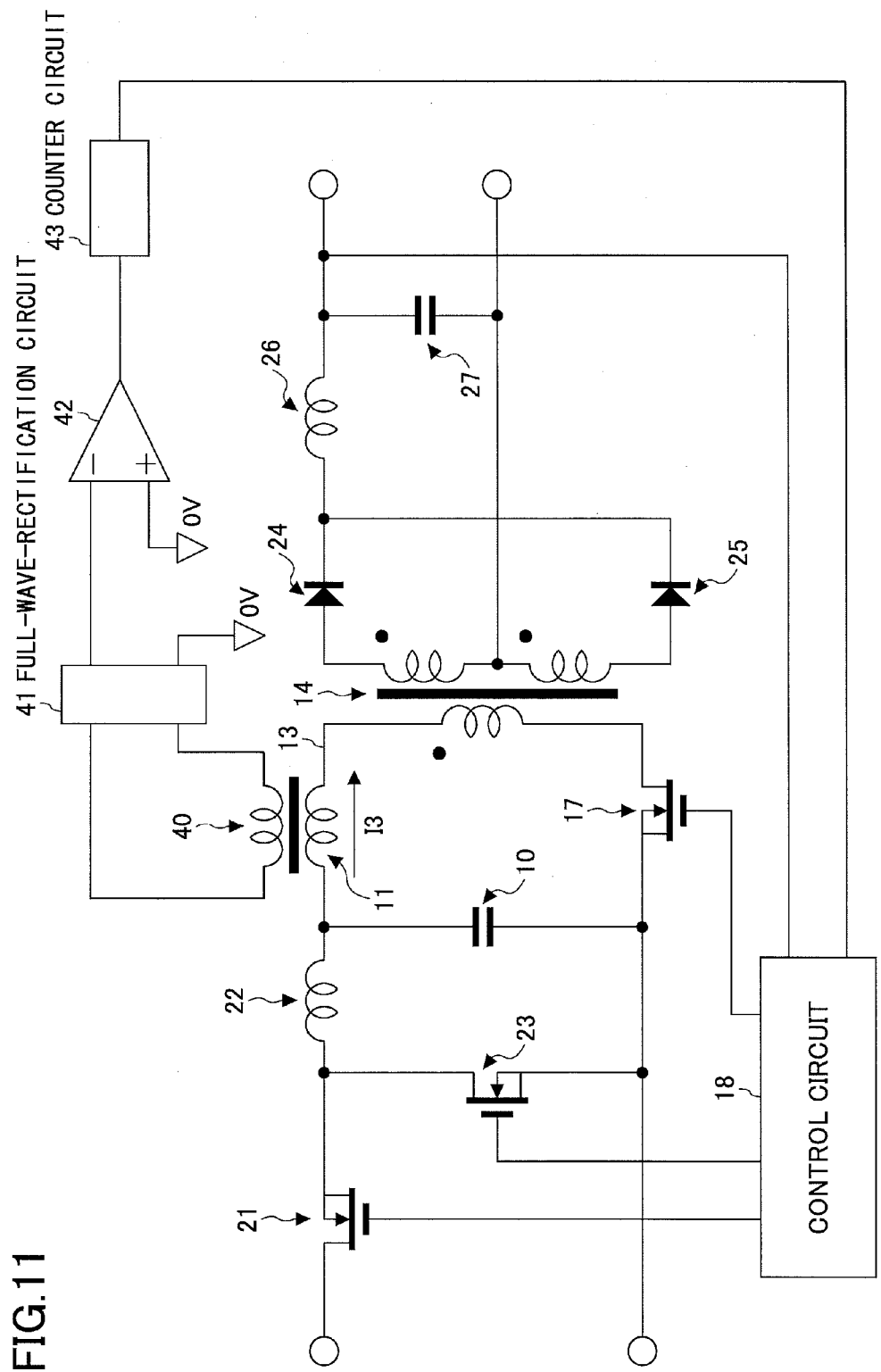
FIG. 11 is a drawing illustrating the configuration for controlling the time at which the switch circuit is turned off.

FIG. 11 is a drawing illustrating the configuration for controlling the time at which the switch circuit 17 is turned off. In FIG. 11, the same elements as those of FIG. 3 are referred to by the same or similar numerals, and a description thereof will be omitted as appropriate.

The DC-DC converter illustrated in FIG. 11 includes a current detecting winding 40, a full-wave-rectification circuit 41, a comparator 42, and a counter circuit 43 in addition to the configuration illustrated in FIG. 3. The current detecting winding 40 has a configuration basically similar to a transformer by which to cause a current to flow in response to the current I3 flowing through the closed-loop current path 13. The full-wave-rectification circuit 41 performs full-wave rectification with respect to the current flowing through the current detecting winding 40. The comparator 42 compares the output of the full-wave-rectification circuit 41 with a predetermined reference voltage to output a voltage responsive to the result of comparison. For example, the comparator 42 may output HIGH when the output voltage of the full-wave-rectification circuit 41 is higher than the reference voltage, and may output LOW when the output voltage of the full-wave-rectification circuit 41 is lower than the reference voltage. The counter circuit 43 counts changes (e.g., falling edges) in the output of the comparator 42, and asserts the output thereof upon the count value becoming equal to a predetermined value. In response to the asserted state of the output of the counter circuit 43, the control circuit 18 changes SW3 from HIGH to LOW. In this manner, the DC-DC converter illustrated in FIG. 11 uses the current detecting winding 40 as a current detector, which detects the current flowing through the closed-loop current path 13 including the switch circuit. The switch circuit 17 is changed from the conductive state to the nonconductive state in response to the result of the current detection.

Figure 12:
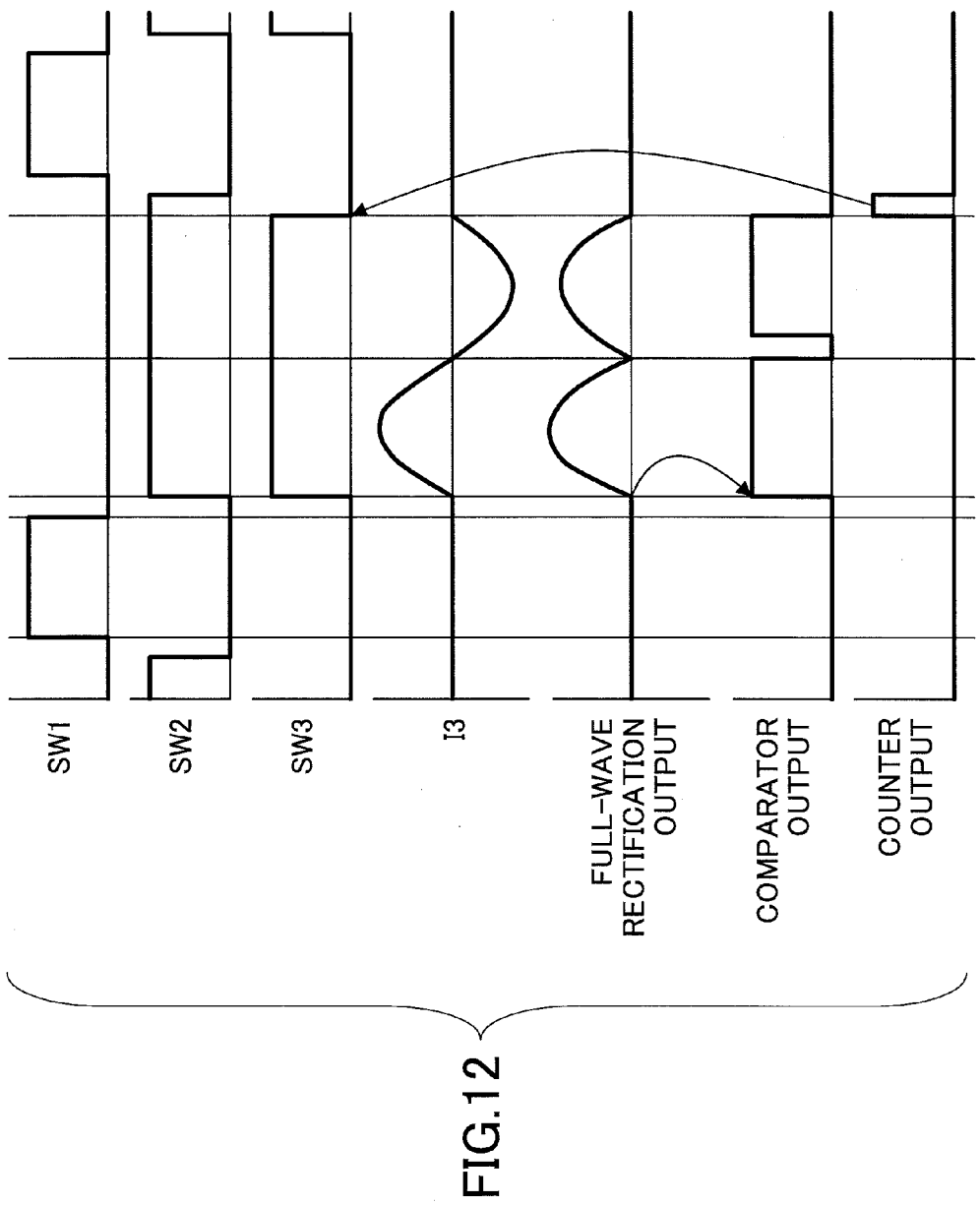
FIG. 12 is a waveform diagram illustrating an example of the operation of the DC-DC converter illustrated in FIG. 11.

FIG. 12 is a waveform diagram illustrating an example of the operation of the DC-DC converter illustrated in FIG. 11. In the example illustrated in FIG. 12, the current I3 flows for the duration of one resonance cycle. At the end of this one cycle, SW3 is changed to LOW, thereby making the switch circuit 17 nonconductive. Specifically, the full-wave-rectification circuit 41 outputs the full-wave-rectified wave form, based on which the comparator 42 outputs a rectangular-wave form including two HIGH pulses within one resonance cycle. The counter circuit 43 counts the falling edges of these HIGH pulses, and asserts the output thereof when the count value becomes equal to 2 (i.e., at the end of the one resonance cycle). In response to the assertion of the output, SW3 is changed from HIGH to LOW. In the example illustrated in FIG. 12, the switch circuit 17 is changed to OFF at the end of the one resonance cycle. Alternatively, the switch circuit 17 may be changed to OFF at the end of a desired number of cycles, such as at the end of two cycles, at the end of three cycles, etc.

Figure 13:
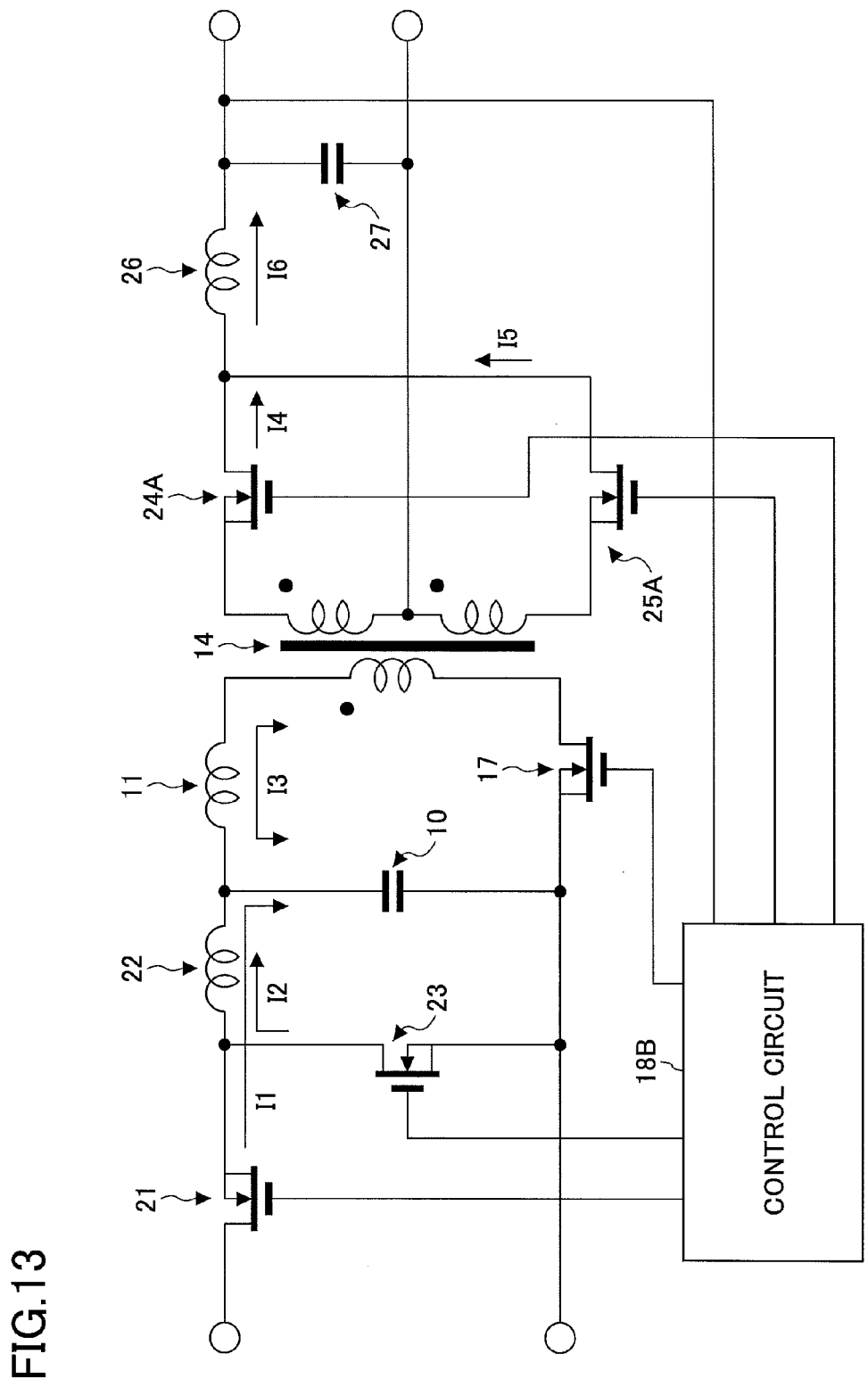
FIG. 13 is a drawing illustrating a variation of the DC-DC converter illustrated in FIG. 3.

FIG. 13 is a drawing illustrating a variation of the DC-DC converter illustrated in FIG. 3. In FIG. 13, the same elements as those of FIG. 3 are referred to by the same or similar numerals, and a description thereof will be omitted as appropriate. The DC-DC converter illustrated in FIG. 13 differs from the DC-DC converter illustrated in FIG. 3 in that the diodes 24 and 25 of the rectifying circuit are replaced with NMOS transistors 24A and 25A. The gate nodes of the NMOS transistors 24A and 25A receive control signals supplied from a control circuit 18B.

The control circuit 18B applies to the gate notes of the NMOS transistors 24A and 25A the control signals that are in synchronization with the resonance oscillation of the current I3, thereby controlling the ON-state and OFF-state of the NMOS transistors 24A and 25A. The control circuit 18B causes the NMOS transistors 24A and 25A to turn on and off in switching cycles equal to $N \cdot (LC)^{1/2}$. In this manner, the rectifying circuit includes the NMOS transistors 24A and 25A as rectification-purpose switch circuits, which are made conductive and nonconductive at such times as are calculated in response to the resonance frequency of the resonance circuit. The use of the NMOS transistors 24A and 25A in place of the diodes 24 and 25 makes it possible to remove the power loss occurring in the diodes, thereby providing an efficient DC-DC converter.

Figure 14:
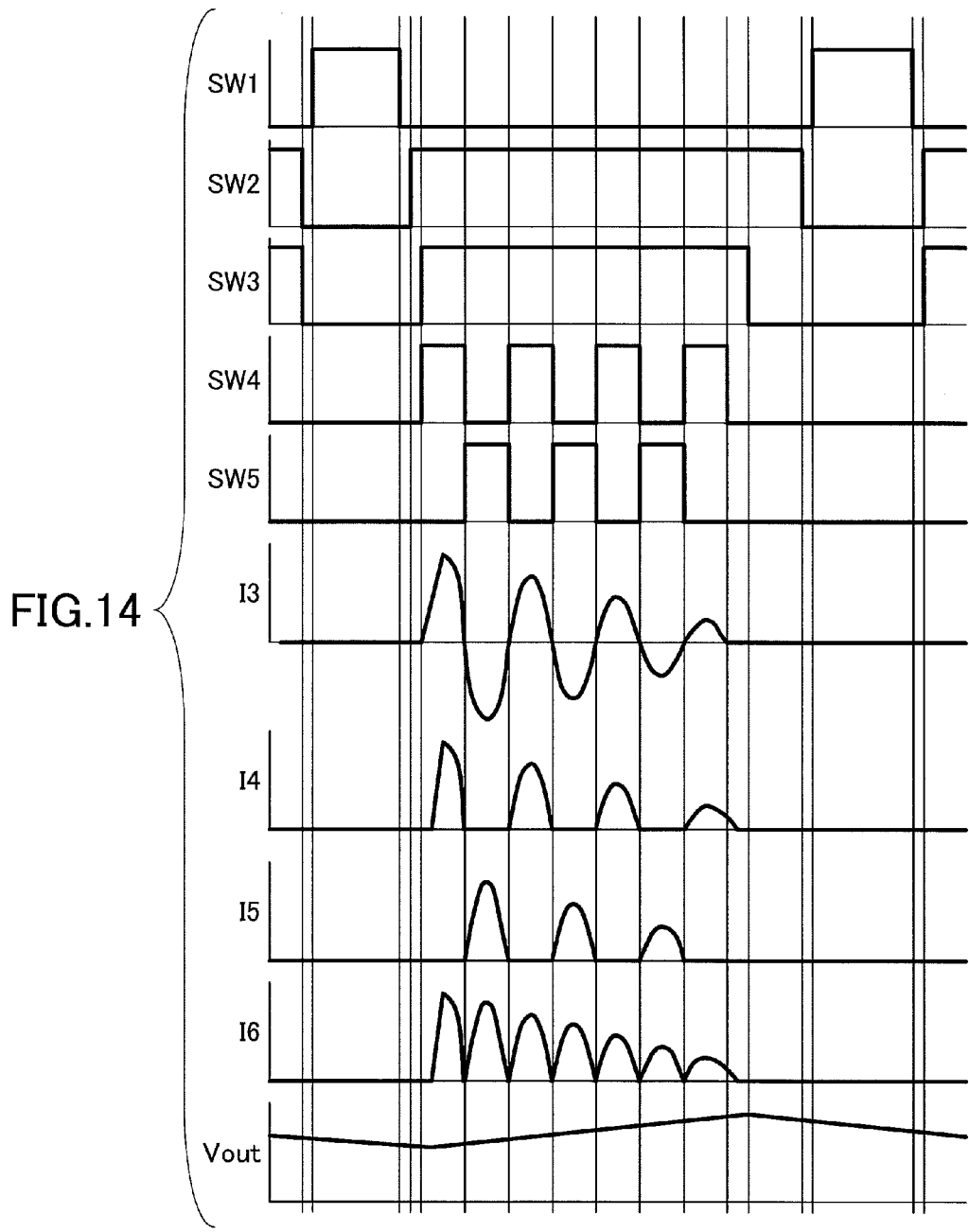
FIG. 14 is a diagram illustrating an example of the operation of the DC-DC converter illustrated in FIG. 13.

FIG. 14 is a diagram illustrating an example of the operation of the DC-DC converter illustrated in FIG. 13. In FIG. 14, SW1 through SW3 and I3 through I6 are the same wave forms as those illustrated in FIG. 7. In the example illustrated in FIG. 14, switching-purpose control signals SW4 and SW5 are generated in synchronization with the resonance oscillation of the current I3. These control signals SW4 and SW5 are applied to the gate nodes of the NMOS transistors 24A and 25A, respectively, illustrated in FIG. 13. With this arrangement, the current I4 flows during the HIGH period of SW4, and the current I5 flows during the HIGH period of SW5. In this manner, the NMOS transistors 24A and 25A are turned on and off in synchronization with the resonance oscillation, thereby achieving half-wave rectification with respect to the currents I4 and I5.

Figure 15:
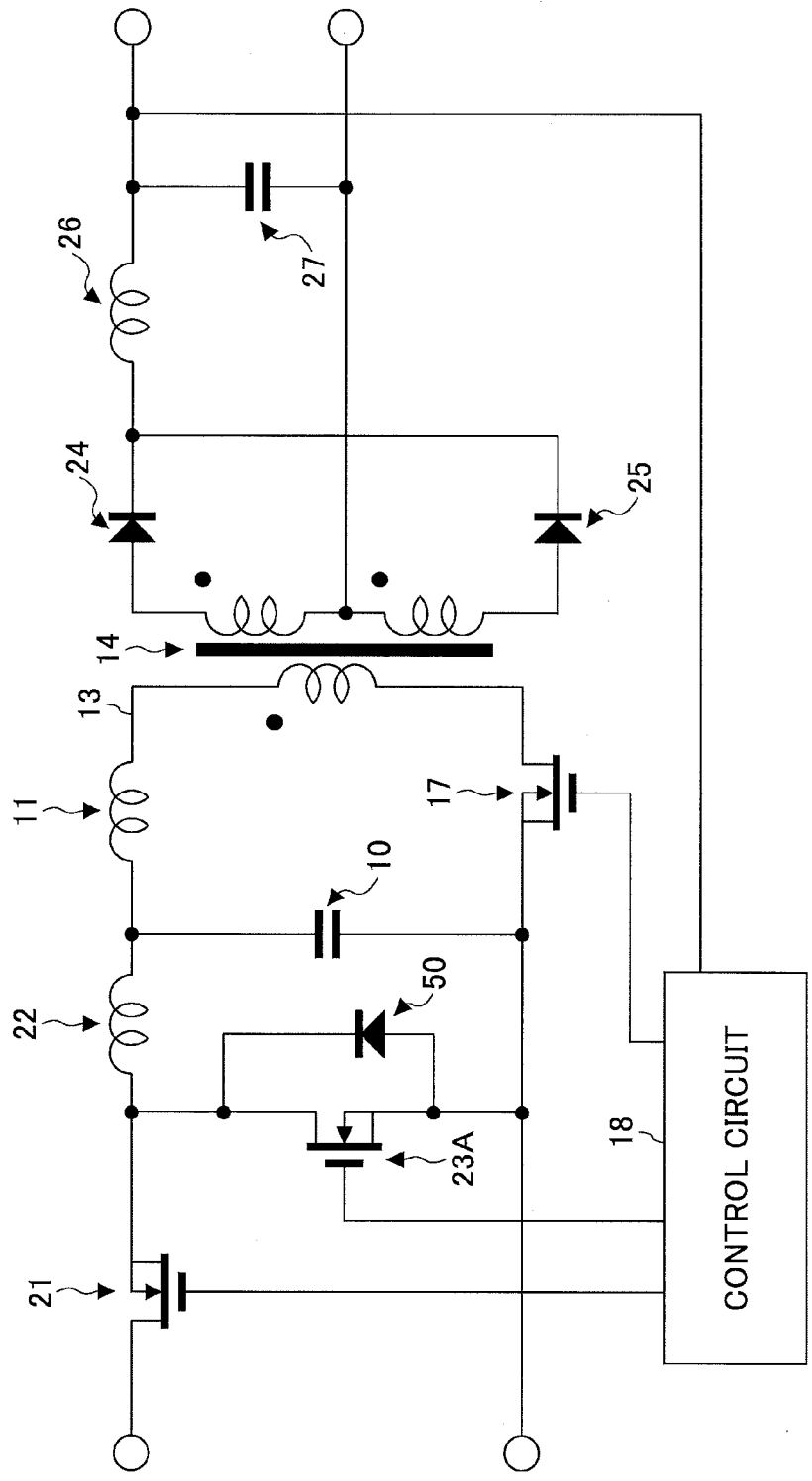
FIG. 15 is a drawing illustrating a variation of the DC-DC converter illustrated in FIG. 3.

FIG. 15 is a drawing illustrating a variation of the DC-DC converter illustrated in FIG. 3. In FIG. 15, the same elements as those of FIG. 3 are referred to by the same or similar numerals, and a description thereof will be omitted as appropriate. The DC-DC converter illustrated in FIG. 15 differs from the DC-DC converter illustrated in FIG. 3 in that the switch circuit 23 is replaced with a switch circuit 23A. The switch circuit 23A is a transistor that has no parasitic diode, such as a GaN-HEMT (high electron mobility transistor) or SiC-FET (field effect transistor). As previously described, the DC-DC converter illustrated in FIG. 3 has the inductor 22 that acts as a force to cause a current to flow even during the period in which both of the switch circuits 21 and 23 are OFF. As a result, the current flows through a parasitic diode that exists in parallel to the NMOS-transistor switch circuit 23. In contrast, the use of the switch circuit 23A having no parasitic diode as in the case of the DC-DC converter illustrated in FIG. 15, together with the large induced electromotive force of the inductor 22, may cause a large current to flow through the switch circuit 23 in the OFF state thereof. Such a current may destroy the switch circuit 23A. In consideration of this, a diode element 50 is provided in parallel to the switch circuit 23A. A current flows through the diode element 50 to the inductor 22, which prevents the switch circuit 23A from being destroyed.

Figure 16:
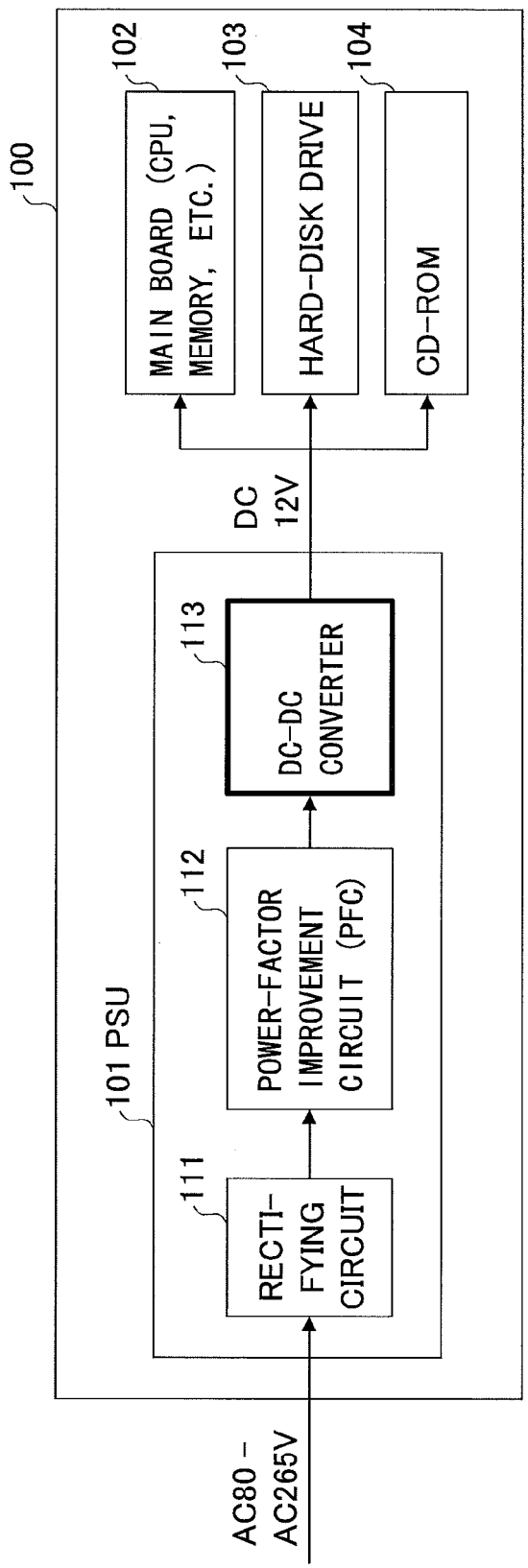
FIG. 16 is a drawing illustrating an example of the configuration of an information apparatus.

FIG. 16 is a drawing illustrating an example of the configuration of an information apparatus. An information apparatus 100 illustrated in FIG. 16 is an apparatus such as a server or a personal computer, and operates with the power supply that is an alternating voltage between 80 V and 265 V, for example. The information apparatus 100 includes a PSU (power supply unit) 101, a main board 102, a hard-disk drive 103, and a CD-ROM drive 104. The PSU 101 receives an alternating voltage as an input, and generates a 12-V direct-current voltage, for example. The generated direct-current voltage is supplied as the power supply voltage to the main board 102, the hard-disk drive 103, and the CD-ROM drive 104. The main board 102 has a CPU (central processing unit), a memory, and so on mounted thereon, and provides an arithmetic function, a control function, etc., with respect to the information apparatus 100. The hard-disk drive 103 stores data relating to the processing of the CPU and programs and the like executed by the CPU. The CD-ROM drive 104 writes and reads information to and from a detachable CD-ROM. The CD-ROM drive 104 may be a drive unit that performs a write operation and a read operation with respect to a DVD (digital versatile disk), for example, in addition to a CD-ROM.

The display unit 101 includes a rectifying circuit 111, a power-factor improvement circuit 112, and a DC-DC converter 113. The rectifying circuit 111 rectifies an input alternating voltage wave form to generate a rectified voltage wave form. The power-factor improvement circuit 112 shapes the voltage wave form output from the rectifying circuit 111 into a wave form close to the rectified wave form of a sinusoidal wave, thereby improving the power factor. The DC-DC converter 113 generates the 12-V direct-current output voltage based on the direct-current voltage output from the power-factor improvement circuit 112. The DC-DC converter 113 may be any one of the DC-DC converters previously described.

According to at least one embodiment, loss in the transformer is reduced in a PWM-control-based DC-DC converter.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A DC-DC converter, comprising:
   a capacitor configured to be charged for a predetermined period by a direct-current voltage;
   an inductor configured to constitute an LC resonance circuit together with the capacitor;
   a closed-loop current path configured to release energy accumulated in the capacitor after the predetermined period to cause a current flowing in the LC resonance circuit to oscillate;
   a transformer configured to receive a current flowing in the closed-loop current path; and
   a rectifying circuit situated on an output side of the transformer,
   wherein the closed-loop current path includes a primary side of the transformer, and no current flows through the primary side of the transformer during the predetermined period for which the capacitor is charged.

2. The DC-DC converter as claimed in claim 1, further comprising:
   a first switch circuit situated in a path outside the closed-loop current path, the first switch circuit configured to be conductive during the predetermined period to supply a charge current to the capacitor and to be nonconductive outside the predetermined time period; and
   a second switch circuit situated in the closed-loop current path, the second switch circuit configured to alternate between a conductive state and a nonconductive state and to be nonconductive at least when the first switch circuit is conductive.

3. The DC-DC converter as claimed in claim 2, further comprising a second inductor situated in the path outside the closed-loop current path and series-connected with the first switch circuit, the charge current flowing through the second inductor.

4. The DC-DC converter as claimed in claim 3, further comprising:
   a second closed-loop current path including the second inductor and the capacitor; and
   a third switch circuit situated in the second closed-loop current path, the third switch circuit configured to alternate between a conductive state and a nonconductive state and to be nonconductive at least when the first switch circuit is conductive.

5. The DC-DC converter as claimed in claim 1, further comprising a control circuit configured to perform feedback control with respect to the predetermined period in response to a voltage responsive to an output of the rectifying circuit.

6. The DC-DC converter as claimed in claim 1, further comprising a control circuit configured to set the predetermined period equal to a length calculated in response to a target output voltage.

7. The DC-DC converter as claimed in claim 2, wherein the second switch circuit is changed from a conductive state to a nonconductive state at a moment at which the current flowing in the closed-loop current path including the second switch circuit becomes zero.

8. The DC-DC converter as claimed in claim 7, further comprising a current detector configured to detect a current flowing in the closed-loop current path including the second switch circuit, the second switch circuit being changed from a conductive state to a nonconductive state in response to a result of detection made by the current detector.

9. The DC-DC converter as claimed in claim 1, wherein the rectifying circuit further includes a rectification-purpose switch circuit, which is made conductive and nonconductive at such times as are calculated in response to a resonance frequency of the LC resonance circuit.

10. The DC-DC converter as claimed in claim 4, further comprising a diode situated in parallel to the third switch circuit, the third switch circuit being a transistor having no parasitic diode.

11. A DC-DC conversion method, comprising:
    charging a capacitor with a direct-current voltage for a predetermined period;
    releasing energy accumulated in the capacitor after the predetermined period to cause a current to flow and oscillate in a closed-loop current path inclusive of an LC resonance circuit that includes the capacitor and an inductor;
    supplying the current flowing in the closed-loop current path to a transformer; and
    rectifying an output of the transformer, wherein the closed-loop current path includes a primary side of the transformer, and no current flows through the primary side of the transformer during the predetermined period for which the capacitor is charged.

12. An information apparatus, comprising:
a DC-DC converter;
a CPU; and
a memory device,
wherein the DC-DC converter includes:
a capacitor configured to be charged for a predetermined period by a direct-current voltage;
an inductor configured to constitute an LC resonance circuit together with the capacitor;
a closed-loop current path configured to release energy accumulated in the capacitor after the predetermined period to cause a current flowing in the LC resonance circuit to oscillate;
a transformer configured to receive a current flowing in the closed-loop current path; and
a rectifying circuit situated on an output side of the transformer,
wherein the closed-loop current path includes a primary side of the transformer, and no current flows through the primary side of the transformer during the predetermined period for which the capacitor is charged.

* * * * *